March 1, 1932.  M. L. CRANDALL  1,847,753
CRANK TURNING LATHE
Filed May 29, 1930   6 Sheets-Sheet 1

INVENTOR
Merton L. Crandall,
BY
ATTORNEY

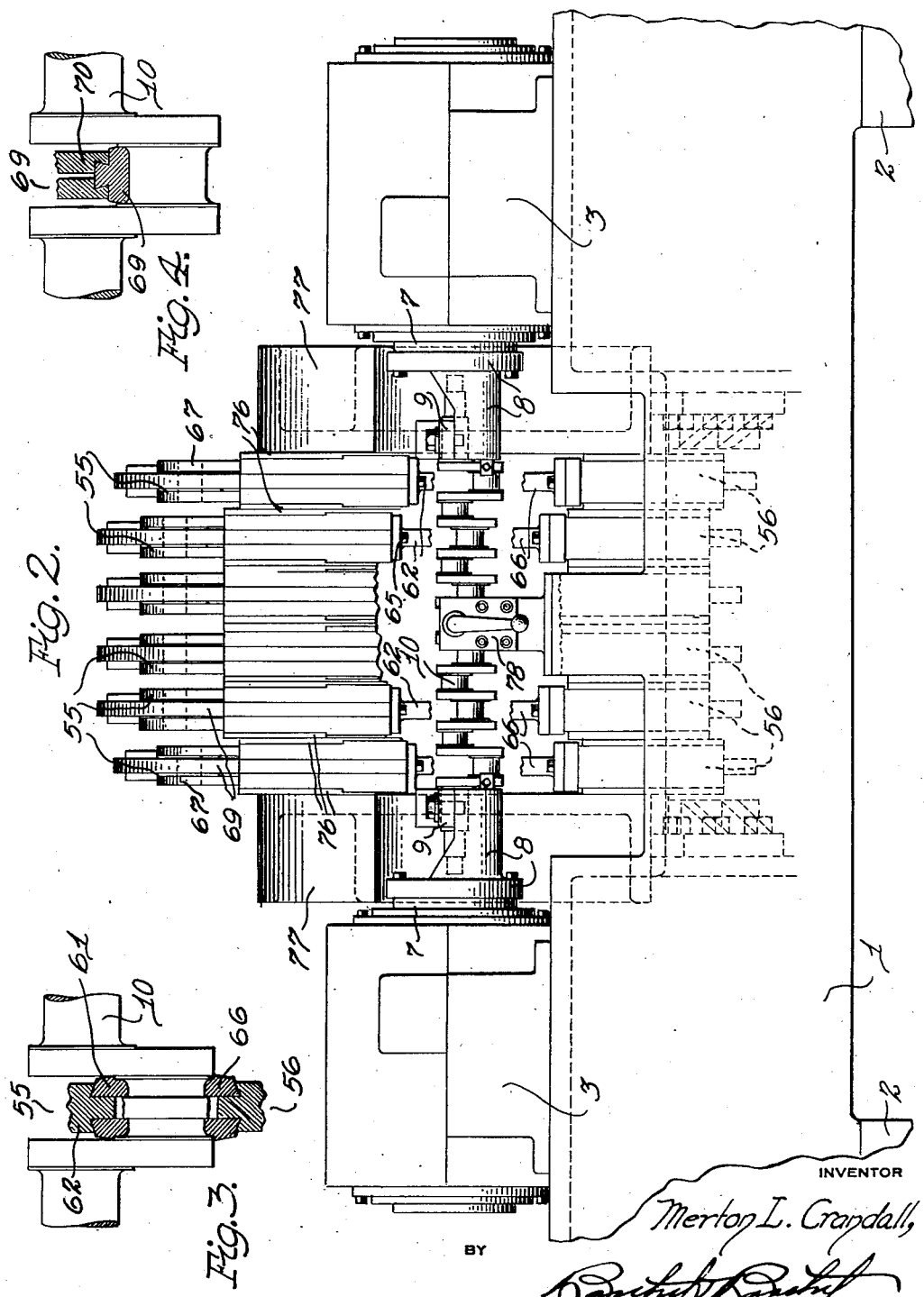

March 1, 1932. M. L. CRANDALL 1,847,753
CRANK TURNING LATHE
Filed May 29, 1930 6 Sheets-Sheet 3

INVENTOR
Merton L. Crandall,
BY
ATTORNEYS

March 1, 1932.  M. L. CRANDALL  1,847,753
CRANK TURNING LATHE
Filed May 29, 1930   6 Sheets-Sheet 4
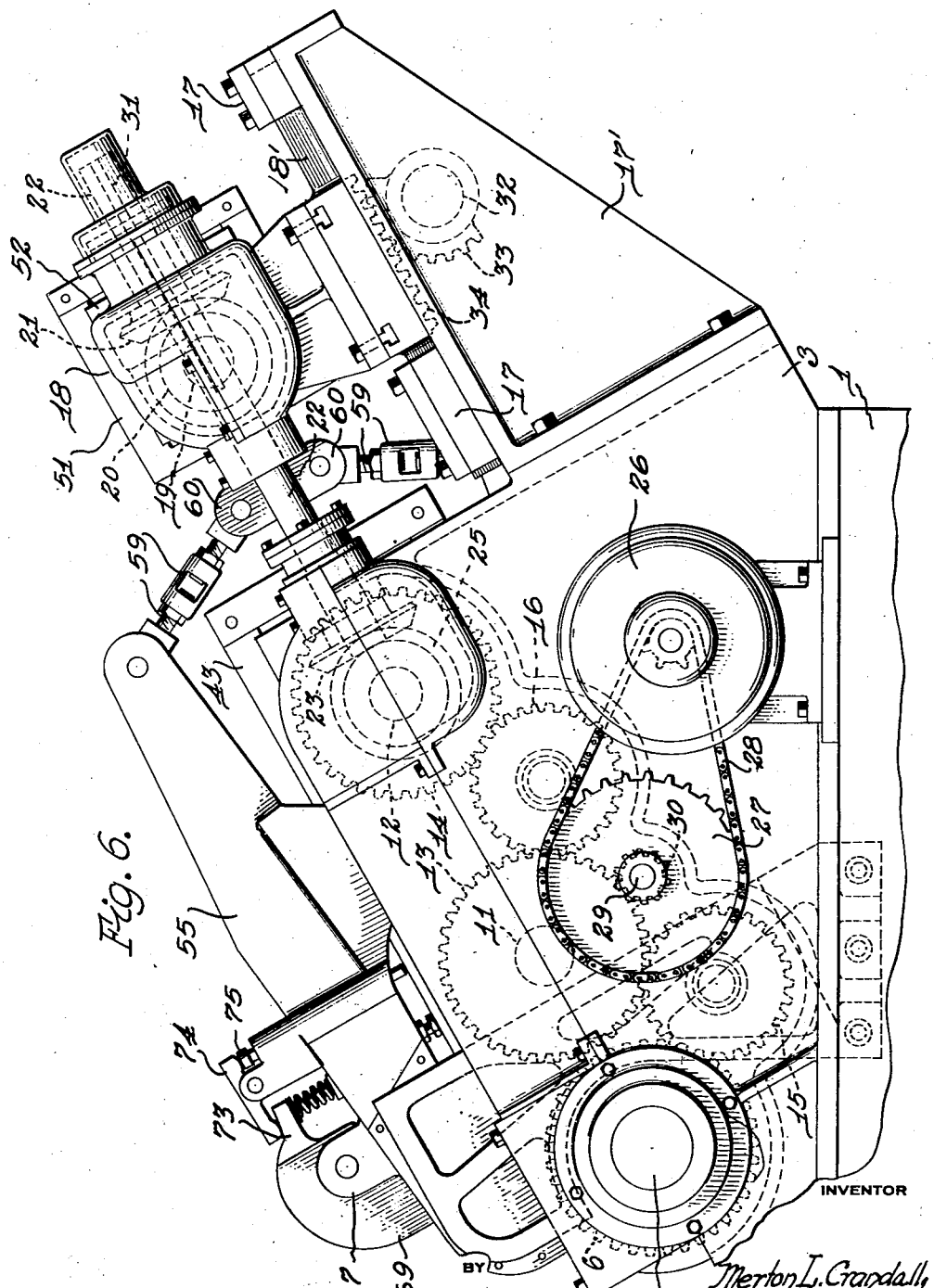
INVENTOR
Merton L. Crandall
ATTORNEYS

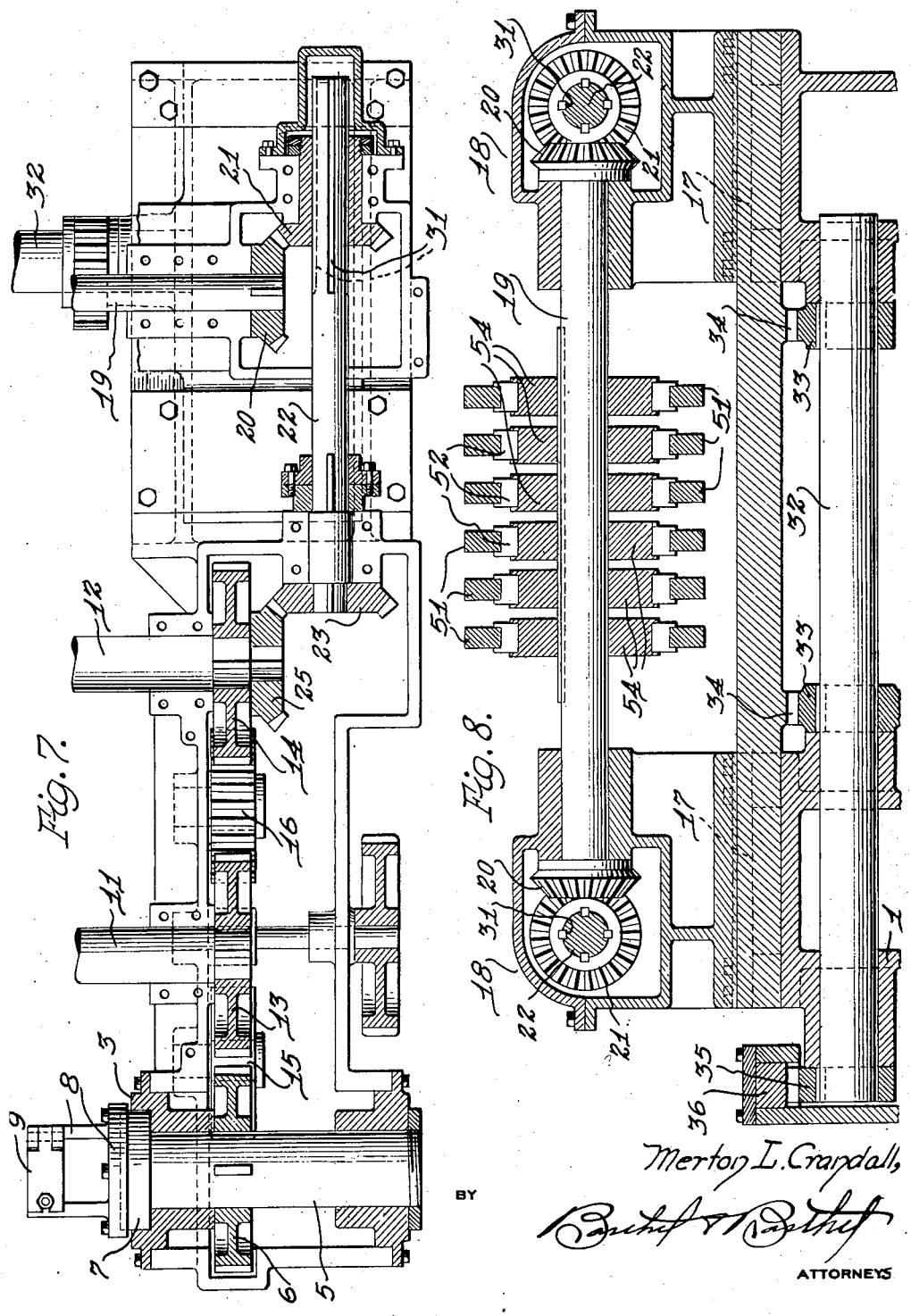

March 1, 1932.  M. L. CRANDALL  1,847,753
CRANK TURNING LATHE
Filed May 29, 1930  6 Sheets-Sheet 6
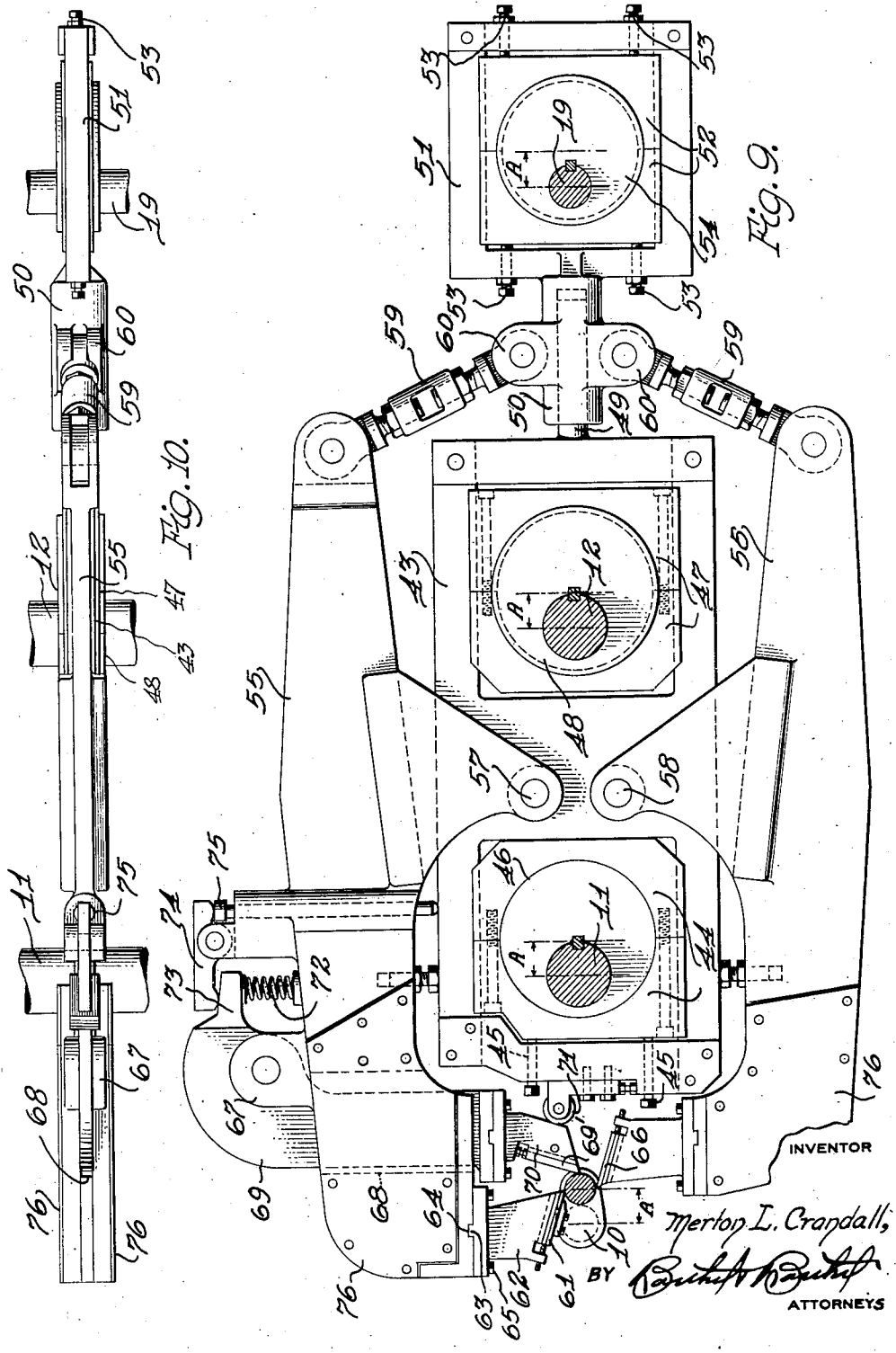

Patented Mar. 1, 1932

1,847,753

UNITED STATES PATENT OFFICE

MERTON L. CRANDALL, OF JACKSON, MICHIGAN

CRANK TURNING LATHE

Application filed May 29, 1930. Serial No. 456,850.

The present invention pertains to a novel lathe of a type particularly adapted for machining crank shafts and the like.

The primary object of the present invention is to devise a lathe for supporting and turning a crank shaft while it is being machined by cutting tools which are arranged and supported in a novel manner which insures accuracy and precision in producing crank shafts of the type used in internal combustion engines. The machine may be utilized to produce a large number of crank shafts of the same dimensions or may be adjusted by varying the size of the eccentrics to machine crank shafts of various sizes.

Another object of the invention is to devise a lathe, for turning the cranks on crank shafts, incorporating a novel method of feeding the cutters or bits into engagement with the surface of the crank by fluid pressure, thereby insuring an even cutting pressure at all stages of the cutting operation and providing positive limit which insure precision and accuracy in the crank shafts which are produced.

With the above and other ends in view the invention consists in the matters hereinafter set forth and more particularly pointed out in the appended claims, reference being had to the accompanying drawings, in which Figure 1 is a top plan view of the present lathe;

Fig. 2 is a front elevation;

Fig. 3 is a fragmentary view of the crank shaft illustrating the final stage of a portion of the cutting operation;

Fig. 4 is a fragmentary view of the crank illustrating the final stage of the cutting operation;

Fig. 6 is a side elevation opposite Fig. 5, and illustrating the driving mechanism;

Fig. 7 is a fragmentary plan view with the cover plate removed and partly in cross section to illustrate the drive mechanism;

Fig. 8 is a transverse cross sectional view taken on the line 8—8 of Fig. 1;

Fig. 9 is a side elevation of one of the tool supporting units, and

Fig. 10 is a top plan view of one of the cutting tool supporting units.

Like characters of reference are employed throughout to designate the corresponding parts.

Figure 1:
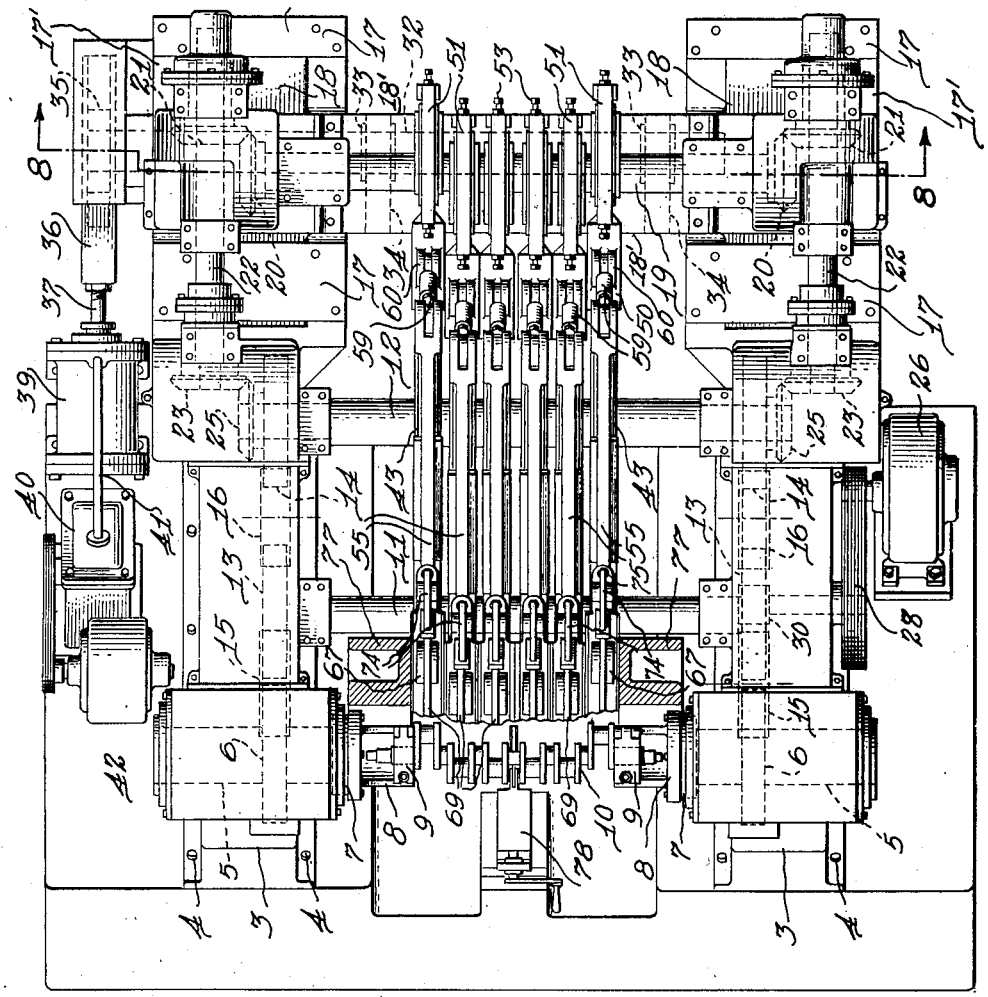
Figure 5:
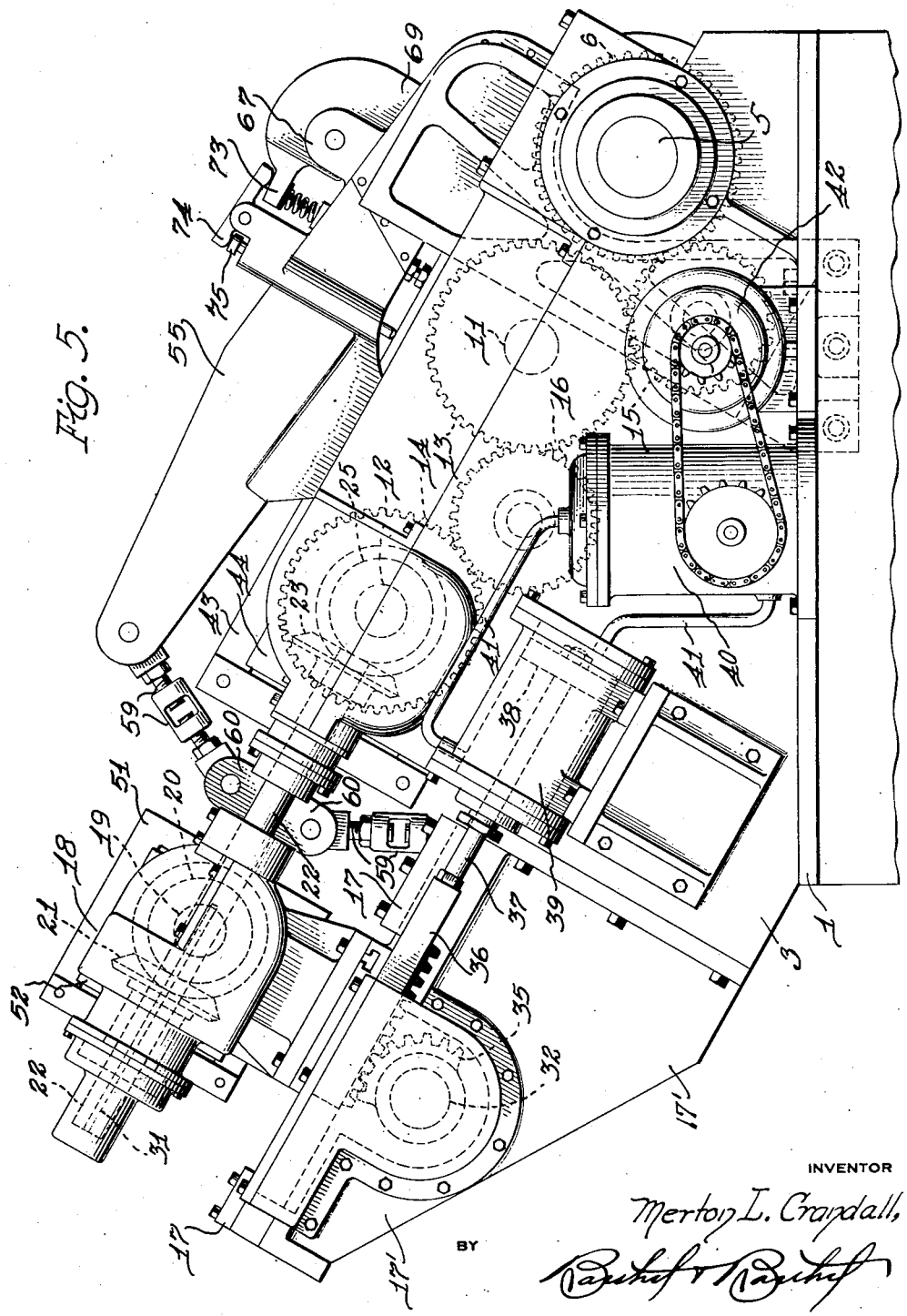
Fig. 5 is a side elevation of the present lathe.

The numeral 1 indicates the bed of the lathe which is supported in the usual manner upon legs 2 and having a pair of head-stocks 3 bolted thereto as at 4. Each headstock supports a shaft 5 to which is keyed a gear wheel 6 and upon the inner ends of these shafts 5 are mounted face plates 7, spaced a distance apart which is slightly greater than the length of the crank shaft 10 to be machined, said crank shaft being already formed with main bearing end portions cut and finished by a separate machining operation. To each face plate 7 is secured a crank shaft supporting chuck 8 having a hinged strap member 9 which encircles the main bearing portion of each end of the crank shaft to hold the same in a definite position and to cause rotation of the shaft.

A pair of cross shafts 11 and 12 extend transversely of the present machine and are mounted adjacent their ends in bearings rigidly secured upon the bed 1. Mounted upon each end of said shafts 11 and 12 respectively, are gear wheels 13 and 14, the gears 13 meshing with idler gears 15 which in turn mesh with said gears 6 on the shafts 5 and also with idler gears 16 which are in mesh with the gears 14 on the shaft 12, these trains of gearing causing the shafts 5, 11 and 12 to rotate in the same direction, and said gears of each train being so proportioned and arranged as to cause all of said shafts to rotate at exactly the same speed.

Mounted in ways or guides 17 on brackets 17' secured on the rear ends of the lathe headstocks 3, are the feed mechanism supporting heads 18 which support a transversely extending shaft 19 having bevelled gears 20 mounted on each end thereof in mesh with the bevelled gears 21 mounted upon shafts 22 adjacent one end of said shafts and upon which shafts at their opposite ends are bevelled gears 23 meshing with bevelled gears 25 on the outermost extremities of the shaft 12. A motor 26 is mounted upon the bed 1 and drives a sprocket 27 by means of a chain 28, said sprocket being fixedly mounted upon a shaft 29 having a small pinion 30 meshing with one of the gear wheels 13 at one end of the machine only, and which gear wheel, through the intermeshing gears, drives the shafts 5, 11, 12 and 19 at the same speed, applying power to both ends of said shafts to avoid undue torsional strain.

The shafts 5, 11 and 12 are mounted in fixed bearings on the bed 1, but it is necessary that the shaft 19 be shifted, the movement of the latter being in a plane at right angles to its axis. The shaft 19 is thus moved by sliding the supporting heads 18 along the guide ways 17 and to accommodate this movement the shafts 22 are provided with elongated keyways 31 which permit the bevelled gear 21 to slide longitudinally thereon without breaking the driving connection therewith.

Mounted in bearings on the brackets 17' is a transverse shaft 32 positioned directly underneath the heads 18 of the feeding mechanism and segments 33 are secured to this shaft 32 to mesh with racks 34 on the lower side of a bar or apron 18' upon which the heads 18 are secured so that rotation of the shaft 32 imparts a lateral reciprocating movement of the apron carrying said heads. Upon one end of the shaft 32 is mounted a third segment 35 which meshes with a third rack 36 connected by a rod 37 with a piston 38 in a cylinder 39, the ends of which are connected by pipes 41 with the ends of a pump cylinder 40 of a pump of any suitable type, operated by an electric motor 42 mounted upon the bed 1.

As to be presently described, a set of cutting tools for forming or turning each crank of the crank shaft 10, is carried by means supported by the shafts 11, 12 and 19, and as these sets of cutting tools are the means for carrying and operating the same, are identical in construction, it will only be necessary to describe in detail, but one of these sets and its operating mechanism, reference being had particularly to Figures 9 and 10 of the drawings.

The supporting means for each set of cutting tools comprises a frame 43 having a split bearing 44 slidably mounted in said frame and adjustable longitudinally thereof by means of set screws 45, said bearing being split to embrace an eccentric 46 which is keyed upon the shaft 11. Within the opposite end of said frame 43, is mounted a similar split bearing 47 in a manner permitting free longitudinal movement thereof, and embracing an eccentric 48 which is keyed to the shaft 12.

Projecting outwardly from the rearmost end of the frame 43 is a stub shaft 49 upon which is sleeved a sleeve 50, integral with the outer end of which is formed a rectanguluar frame 51 carrying a split bearing 52 to receive an eccentric 54 keyed to said shaft 19 and adjustable in said frame by means of set screws 53.

The letter A indicates a distance equal to the distance between the axis of the crank shaft being operated upon and the axis of the crank pins thereof, or throw of the cranks of said crank shaft and it is important that the distance between the centers of the eccentrics 46 and 48 and their respective shafts 11 and 12 be identical with this throw of the crank shaft. When these distances are identical, it becomes apparent that the above described gearing, which rotates all of said shafts 11, 12 and 19 in the same direction and at the same rate of speed, and also rotates the work or crank shaft 10 at the same speed, causes the frames 43 and 51 to follow exactly the movement of the cranks of the work or crank shaft, due to the manner in which these frames are mounted upon the eccentrics. In other words, the frames 43 and 51 are always in the same relative position to the center line of the crank bearing at all stages of movement of the latter.

Tool carrying holders or rockers 55 and 56 are pivotally mounted intermediate their ends, as at 57 and 58, upon said frame 43 to extend longitudinally thereof above and below the same with their tool carrying ends projecting beyond one end of the frame 43 and at their opposite ends, these holders are pivotally connected by means of bolts and turnbuckles 59 with ears 60 on the sleeve 50. Upon the forward or tool carrying extremity of the tool carrying holder or rocker 55, is mounted an adjustable cutting bit 61, said bit being mounted upon a support 62 which is provided with a tongue 63 engaging a groove 64 in the lower face of the end of said rocker 55 and secured therein by means of bolts 65. This bit 61 is so positioned that the cutting edge thereof projects inwardly or toward the end of the frame 43, and the lower tool holder or rocker 56 is provided with a similarly mounted cutting bit 66 which is supported in a like manner with its cutting edge projecting in a direction away from the frame 43. These bits thus engage the crank pin of the crank shaft at opposite sides thereof and are set at an inclination to the horizontal, in cutting position.

A pair of ears 67 is formed integral with the top of the tool holder 55 adjacent an opening or groove 68 therein adjacent the tool carrying end thereof and a swinging arm 69 is pivotally mounted between these ears to project downwardly through the slot 68, and carry at its lower end a cutting bit 69' adjustably secured upon the lower end of said arm 69 by means of the supporting member 70 which rests in contact at its rear side, with a roller 71 mounted on the forward end of the frame 43. This bit is thus positioned to have its cutting edge engage the crank pin intermediate the bits 61 and 66 and this roller 71 forces the bit into contact with the surface of the crank pin to be cut, while a spring 72 exerts force between the rocker 55 and an arm 73 on said arm 69 at the side of its pivot opposite that at which the bit is located to swing said arm and withdraw the cutting tool from the surface to be cut, and to also yieldingly hold the tool carrying member 70 in contact with the roller 71. To provide a stop for limiting the rocking movement of said arm 69 toward the work, a rocking lever 74 is pivotally supported intermediate its ends with one end engaging the upper side of the arm 73 and its opposite end engaged by a pin 75 guided in an opening in the tool carrying rocker 55 to engage the upper edge of the frame 43 at its lower end.

Each of the tool holders or rockers 55 and 56 are provided with side bearing plates 76, and when the holders are mounted in gangs corresponding in number to the number of cranks on the shaft 10, these bearing plates on the several holders are in contact with each other to guide and hold the several rockers in perfect alignment and in proper relation to each other. Rigid bearing heads 77 (Figs. 1 and 2) are provided at each end of the bed to engage the outermost holders of the series and hold all of the tools in the proper relation to each other and to the work.

An adjustable mid-support 78 is mounted upon the bed 1 to engage the center main bearing of the crank shaft 10 being turned, to relieve the torsional strain thereon while the cutting operation of the cranks of the crank shaft is being performed.

In operation, the shafts 5, 11, 12 and 19 are all rotated in the same direction at the same rate of speed, causing the cranks of the crank shaft 10 to rotate in unison with the eccentrics 46, 48 and 54. Rotation of these eccentrics causes the frames 43 to describe a circle which is identical with the circle scribed by the cranks of the shaft 10 and thus cause the cutters to also exactly follow the movement of said cranks and accurately machine the same as the crank shaft turns.

Fluid pressure acting upon the piston 38, causes the rack 36 to turn the shaft 32 and move the frame 51 towards the frame 43 which causes the sleeve 50 to slide on the post 49 and the bolts and turnbuckles 59 to spread the rear ends of the tool holders 55 and 56 apart and rock them upon their pivots 57, 58, thus forcing the cutters into cutting engagement with the cranks of the crank shaft.

Precision and accuracy are insured by making the amount of eccentricity of the eccentrics 46, 48 and 54 correspond to the throw of the cranks of the crank shaft and in order to accommodate crank shafts having cranks of various throws, it is only necessary to remove these eccentrics and insert eccentrics of a throw corresponding to the throw of such cranks.

Although a specific embodiment of the present invention has been illustrated and described, it is to be understood that various changes may be made in the details of construction without departing from the spirit of the invention as set forth in the appended claims, and such changes are contemplated.

What I claim is:—

1. A machine of the character described comprising rotatable crank shaft supporting members, a pair of eccentrics mounted to rotate upon fixed axes, means for causing said eccentrics to rotate in unison with said crank shaft supporting members, a frame mounted upon said eccentrics, pivoted tool holders mounted upon said frame, cutters upon said tool holders, an eccentric slidably mounted and geared to rotate in unison with said first named eccentrics, and means carried by said last named eccentric and connected to said pivoted tool holders, whereby sliding movement of said last named eccentric causes a change in the relative position of said pivoted tool holders.

2. A machine of the character described comprising rotatable crank shaft supporting members, a pair of eccentrics geared to rotate in unison with said shaft supporting members upon fixed axes, a frame supported upon said eccentrics, tool holders pivotally mounted upon said frame, cutter bits carried by said tool holders, an eccentric slidably mounted and geared to rotate in unison with said first named eccentrics, and a frame supported upon said last named eccentric and connected to said pivoted tool holders whereby the sliding movement of said last named eccentric imparts pivotal movement to said tool holders, and fluid pressure means for causing sliding movement of said last named eccentric.

3. A machine of the character described comprising rotatable crank shaft supporting members, a frame, a pair of eccentrics geared to rotate in unison with said crank shaft supporting members and upon which eccentrics said frame is mounted, tool holders pivotally mounted upon said frame, a carriage, a shaft mounted upon said carriage, an eccentric mounted upon said shaft, and a frame mounted upon said last named eccentric and connected to said pivoted tool holders, whereby sliding movement of said carriage causes pivotal movement of said tool holders.

4. A machine of the character described comprising rotatable crank shaft supporting members, a frame, a pair of eccentrics upon which said frame is mounted, gearing connecting said eccentrics and said crank shaft supporting members to rotate in unison, tool holders pivotally mounted upon said frame, tools carried by the free ends of said holders, a shaft, an eccentric mounted upon said shaft, a slidable carriage for said shaft, a frame mounted upon said last named eccentric, means connecting said last named frame and the rear ends of said pivoted tool holders, and means for imparting movement to said carriage.

5. A machine of the character described comprising rotatable crank shaft supporting members, a frame, a pair of eccentrics carrying said frame, means for rotating said eccentrics in unison with said crank shaft supporting members, tool holders pivotally mounted intermediate their ends upon said frame, a carriage mounted for sliding movement, a shaft on said carriage, an eccentric mounted upon said shaft, a frame mounted upon said last named eccentric and connected to the rear ends of said pivoted tool holders, and means for imparting movement to said carriage, said means comprising racks upon said carriage, segments to mesh with said racks, and fluid pressure means for actuating said segments.

6. A machine of the character described comprising rotatable crank shaft supporting members, a pair of frame supporting eccentrics geared to rotate in unison with said crank shaft supporting members, tool holders pivotally mounted upon said frame, a sliding carriage, a shaft on said carriage, an eccentric mounted upon said shaft, a frame mounted upon said last named eccentric and connected to said pivoted tool holders whereby sliding movement of said carriage causes pivotal movement of said tool holders, means for imparting movement to said carriage, said means comprising a rack mounted upon said carriage, a cross shaft, segments carried by said cross shaft to mesh with said rack, a cylinder, a reciprocable piston in said cylinder and a connecting rod connecting said rack and piston, and fluid pressure means for causing reciprocation of said piston.

7. In a machine of the character described, the combination of rotatable crank shaft supporting members, a frame member, means for causing said frame member to follow the rotative movement of the crank of a crank shaft supported and rotated by said members, tool holders pivotally attached to said frame member for swinging movement thereon toward and from each other, a tool carried by each of said tool holders adjacent an end thereof to engage the crank pin of the crank shaft at opposite sides thereof, and means movable with and relative to said frame member for imparting swinging movement to said tool holders upon said frame member to adjust said tools toward said crank pin.

8. In a machine of the character described, the combination of rotatable crank shaft supporting members, a frame member, means for causing said frame member to follow the rotative movement of the crank of a crank shaft supported and rotated by said members, a pair of tool holders pivotally attached to said frame member for pivotal movement thereon with opposed ends of said holders projecting beyond an end of said frame member, a tool carried by the projecting end of each tool holder to engage the crank pin of a crank shaft at opposite sides of said pin, a second tool pivotally attached to and carried by one of said tool holders to engage said pin intermediate the points of engagement of said other tools therewith, means movable with and longitudinally of said frame member relative thereto for imparting a pivotal movement to said tool holders to bring the tools carried thereby into engagement with said pin, and means on said frame member and movable therewith for holding said second tool in engagement with said crank pin during rotation of said crank shaft.

9. In a machine of the character described, the combination of rotatable crank shaft supporting members, a frame member, means for causing said frame member to follow the rotative movement of the crank of a crank shaft supported and rotated by said members, a pair of tool holders pivotally attached to said frame member for pivotal movement thereon with opposed ends of said holders projecting beyond an end of said frame member, a tool carried by the projecting end of each tool holder to engage the crank pin of a crank shaft at opposite sides of said pin, a second tool pivotally attached to and projecting from the projecting end of one of said tool holders to engage said pin intermediate the points of engagement of said other tools therewith, means for imparting a pivotal movement to said tool holders, and means on said frame for engaging and swinging said second tool upon its pivotal support toward said pin.

10. In a machine of the character described, the combination of rotatable crank shaft supporting members, a frame member, means for causing said frame member to bodily follow the rotative movement of the crank of a crank shaft supported and rotated by said members, a pair of tool holders pivotally attached intermediate their ends to said frame with one end of each holder projecting beyond the end of said frame to swing toward and from the projecting end of the other holder, a tool carried by the projecting end of each holder to engage the crank pin of a crank shaft supported and rotated by said members and at opposite sides of said pin, means movable with said frame at the end thereof opposite that at which said tools are located, said means being operatively connected to the free ends of said tool holders and movable toward the adjacent end of said frame to simultaneously rock said tool holders in opposite directions upon said frame during movement of said frame with said crank pin and bring said tools into engagement with said pin.

11. In a machine of the character described, the combination of rotatable crank shaft supporting members, a frame member, means for causing said frame member to bodily follow the rotative movement of the crank of a crank shaft supported and rotated by said members, a pair of tool holders pivotally attached to said frame member at opposite sides thereof with one end of each holder projecting beyond an end of said frame, a tool carried by the projecting end of each holder to engage the crank pin of a crank shaft supported and rotated by said members and at opposite sides of said pin, a third tool to engage said pin intermediate the points of engagement of the other tools therewith, a carrier member to which said third tool is attached, said carrier member being pivotally attached to one of said tool holders, yielding means for swinging said carrier member, means on the end of said frame for engaging said carrier member and holding its tool engaged with said crank pin, and means for turning said tool holders in opposite directions upon their pivotal supports on said frame to swing their tool carrying ends toward said crank pin of said crank shaft.

In testimony whereof I affix my signature.

MERTON L. CRANDALL.